United States Patent [19]

Franken et al.

[11] 4,253,963
[45] Mar. 3, 1981

[54] ASYMMETRICAL ULTRAFILTRATION MEMBRANE ON THE BASIS OF CELLULOSE TRIACETATE

[75] Inventors: Walter Franken, Bovenden; Dieter Nussbaumer; Horst Perl, both of Goettingen; Ludwig Weickhardt, Bovenden, all of Fed. Rep. of Germany

[73] Assignee: Sartorius GmbH, Goettingen, Fed. Rep. of Germany

[21] Appl. No.: 28,805

[22] Filed: Apr. 10, 1979

[30] Foreign Application Priority Data

Apr. 13, 1978 [DE] Fed. Rep. of Germany ....... 2816086

[51] Int. Cl.³ .............................................. B01D 39/18
[52] U.S. Cl. .................................. 210/500.2; 210/506; 264/41
[58] Field of Search .................. 210/500 M, 502, 503, 210/490, 506, 504; 55/158; 428/532; 204/296; 429/247; 536/69, 70; 264/41, 49

[56] References Cited

U.S. PATENT DOCUMENTS

| | | | |
|---|---|---|---|
| 3,855,133 | 12/1974 | Roehsler | 210/490 |
| 3,862,030 | 1/1975 | Goldberg | 210/24 |
| 4,147,622 | 4/1979 | Nussbaumer | 210/23 H |
| 4,188,418 | 2/1980 | Livingston | 264/41 X |

FOREIGN PATENT DOCUMENTS

2340176 2/1974 Fed. Rep. of Germany ............ 264/41

OTHER PUBLICATIONS

Hackh's Chemical Dictionary, Fourth Edition, J. Grant Editor, McGraw Hill Book, Co. N.Y. 1973, p. 610.
The Condensed Chemical Dictionary, Ninth Edition, G. Hawley van Nostrand Reinhold Co. N.Y. 1977, pp. 773, 774.
Rubber Technology and Manufacture, C. Blow Editor, CRC Press, Cleveland, Ohio, 1971, p. 193.

*Primary Examiner*—Charles N. Hart
*Assistant Examiner*—David R. Sadowski
*Attorney, Agent, or Firm*—Browdy and Neimark

[57] ABSTRACT

An asymmetrical ultrafiltration membrane based on cellulose triacetate, optionally substituted by up to 30% cellulose diacetate, is made wettable without tendency to embrittlement or shrinkage by adding hydrophobic synthetic silicic acid to the casting solution.

11 Claims, No Drawings

ASYMMETRICAL ULTRAFILTRATION MEMBRANE ON THE BASIS OF CELLULOSE TRIACETATE

FIELD OF THE INVENTION

The present invention relates to assymmetrical ultrafiltration membranes based on of cellulose triacetate and more particularly to such membranes having improved wettability and suitable for use in the medical field.

BACKGROUND OF THE INVENTION

In membranes of cellulose acetates it is generally known (German Auslegeschrift No. 1,100,941) to improve wettability with the aid of the addition of commercial wetting agents.

Furthermore, it is known to carry out the drying of ultrafiltration membranes after impregnation with glycerin. The impregnation is intended to prevent an irreversible flow-through reduction and embrittlement or shrinkage. According to this method, a sufficient wettability of the dried cellulose triacetate membrane cannot be achieved, however, and the flow-through or passage output is below the original value prior to drying. If the membrane is to be employed as ultra- and hemofiltration membrane in the medical field, the use of wetting agents is precluded a priori.

SUMMARY OF THE INVENTION

Therefore it is an object of the present invention to provide for a membrane of the type mentioned hereinabove which has, on the one hand, a good wettability and, on the other hand, shows no tendency to embrittlement and shrinkage and is well suited for use in the medical field.

This object is obtained, in accordance with the present invention, with an asymmetrical dry ultrafiltration membrane based on cellulose triacetate, if desired in mixture with diacetate, prepared with the addition of hydrophobic synthetic silicic acid to the casting solution.

It has surprisingly been found that by addition of hydrophobic synthetic silicic acid (for example Aerosil R 972 or SIPERNAT 17, Degussa) to the casting solution, a flawless wettability of the dried membrane and conservation of the flow-through or passage rates are effectively achieved. In contrast to the expectations which are attributed to the silicic acid having been rendered hydrophobic on the basis of the chemical-physical properties thereof, the addition of a hydrophobic filler acts in the direction of increasing the hydrophilic condition of the end product.

DETAILED DESCRIPTION OF PREFERRED EMBODIMENTS

Hydrophobic synthetic silicic acids are known. These are products made from the usual hydrophilic silicic acids, the latter having been made either pyrogenically or by precipitation which, analytically considered, are fairly pure $SiO_2$; in the hydrophobic material the hydroxyl groups present at the surface of the silicic acid and/or of the $SiO_2$ are brought into reciprocal action with suitable reaction partners and the silicic acid is thereby rendered hydrophobic.

Best known among the pyrogenic silicic acids is the type Aerosil by the Degussa company. These silicic acids are produced by hydrolysis of silicon tetrachloride in an oxyhydrogen flame and have an $SiO_2$ content of more than 99.8%. They are composed of amorphous spherical particles which have a diameter of from several $\mu m$ to 40 $\mu m$. In a volume of approximately 15 ml, 1 gram of such silicic acid has a surface of 100 to 400 $m^2$ and more. Generally speaking, the figure following the designation corresponds approximately to this surface according to BET. In the silicic acid having been rendered hydrophobic, the $SiO_2$ content is slightly lower because of the hydrophobe addition.

The precipitation silicic acids are generally obtained by conversion of alkalisilicates with acids in the form of white deposits of amorphous silicic acids which, after filtering and washing, are dried and, if desired, additionally ground. Drying is effected primarily by spray-drying. The best known products of this kind are the sipernates. SIPERNAT 17 is an hydrophobic product, namely a carrier silicic acid yielded by spray-drying of aqueous silicic acid suspensions, whose secondary particles are about 80% within the range of between 40 and 90 microns. The size and character of the secondary particles are determined by the conditions of the spray-drying. Present also at the surface of these hydrophilic precipitation silicic acids are free hydroxyl groups which lead, by conversion with alkyl halide silanes, to hydrophobic silicic acids in which the hydroxyl groups are replaced by organic residues. In the case of SIPERNAT 17, this is the reaction product of a precipitation silicic acid with organochlorosilane. The mean particle size of the secondary particles is in this case only 3 $\mu m$, the BET surface amounts to approximately 110 $m^2/g$, and the pH value of a 5% aqueous dispersion in water to acetone or methanol 1:1 is about 6.

With regard to hydrophobic silicic acid yielded by flame hydrolysis, attention is here directed to the following literature sources: "Chemiker-Zeitung/Chemische Apparatur" [Chemists' Newspaper/Chemical Apparatus] 89 (1965), pp. 437 to 440, issue 13, as well as the prospectus of the Degussa company "Hydrophobes Aerosil" [Hydrophobic Aerosil], manufacture, properties, and behavior. With regard to hydrophobic silicic acid obtained by precipitation, attention is directed to the series of phamphlets Application Techniques Pigments No. 30 "SIPERNAT und AEROSIL fuer die Futtermittelindustrie" [SIPERNAT and AEROSIL for the Coating Agent Industry] of the Degussa company, date of issue June 20, 1969, in which the preparation of SIPERNAT 17 has been described in detail. The production of this type of silicic acid has been explained in earlier publications of the Degussa company. All of these publications of the firm Degussa are meant to be explicitly incorporated by reference into the present disclosure.

While it is true that the use of hydrophilic silicic acids, for example of the type Aerosil COK 84, 200, will equally lead to an increase of the wettability, at the same time they will also lead to considerable shrinking and to a considerable reduction in output during drying. For obtaining the object the following framework values are essential for the invention:

It is necessary to employ in the casting solution approximately 1 to 30 percent by weight, particularly 3 to 25% by weight of hydrophobic synthetic silicic acid, referred to the total solid content. For high D-values for water and a good protein retention a content of from 5 to 10% by weight is preferred, and for high D-values for protein a content of from 10 to 25% by weight are particularly preferred.

The mechanical strength will decrease if the silicic acid content is too high, for example if it amounts to more than 30% of the total solid content in the casting solution.

The present invention is applicable to the known asymmetrical triacetate membranes which may also contain diacetate, if necessary.

The ratio of acetone to dioxane in the casting solution amounts particularly to 2:1 to 1:2, preferably 0.8 to 1.2:1.

The share of formamide, referred to the solid content, determines the separating boundary. Depending upon the desired separating boundary, the ratio of solid content to formamide is about 1:0.8 to 1:4. Formamide may be replaced either partially or completely by other lower aliphatic amides, preferably acetamide.

A preferred embodiment of the composition of the casting solution and of the casting of asymmetrical triacetate membranes has been disclosed in the German Offenlegungsschrift p 26 21 519.0-41.

Employed as cellulose triacetate is preferably a relatively low-molecular triacetate, particular those types whose viscosity ($\eta$) in a 2% solution in methylene chloride/methanol 9/1, measured according to Hoeppler at 25° C., amounts to maximally 10 cP. Viscosities around 7.5 cP to 10 cP are very well suitable. The acetyl content amounts preferably to at least about 43%, particularly 43.5% or more. Pure triacetate would have an acetyl content of 44.8% which, however, is hardly achieved in actual practice. The types T 900 and T 700 of the Bayer company, for example, are very well suitable. For the purpose of obtaining a specific separating boundary, the triacetate may be partially mixed with cellulose diacetate, for example with up to 30% diacetate, referred to CTA. A suitable diacetate type is, for example, E 398-3 (Eastman).

According to preferred embodiments, the silicic acid addition in membranes consisting totally or predominantly of triacetate amounts to from 3 to 10% of the total solid content (i.e. acetate+silicic acid).

Pyrogenic silicic acid, particularly the type R 972 of the Degussa company, is presently preferred.

The casting of the membranes takes place according to the precipitating bath process while using ice water as precipitating agent, as is known per se for membranes of this type.

Membranes having this composition with this combination of materials display a low tendency toward shrinkage, have practically no flow-through reduction during drying, and can be processed flawlessly. They may also be impregnated with glycerin in the conventional manner and dried without difficulty.

For the phenomenon, which is actually paradoxical, that the reciprocal action of the largely hydrophobic membrane matrix (cellulose triacetate) with a hydrophobic filler leads to an increase of the hydrophilic condition of the membrane, there exist two possible explanations which stem from the residual OH content of both cellulose triacetate and hydrophobic synthetic silicic acid.

The first explanation is based on the fact that the degree of substitution of commercial cellulose triacetates is generally below 2.8, i.e. on an average every tenth to fifteenth glucose unit has one unesterified hydroxyl group. Within the polymer, the free hydroxyl groups are, however, coordinatively saturated by hydrogen bridges with respect to the acetyl groups being present in excess, and are therefore not accessible to a reciprocal action with water. The addition of a finely-dispersed hydrophobic filler could now bind preferredly a significant constituent of the hydrophobic groups of the polymer and hence indirectly free a corresponding number of hydroxyl groups.

The second possible explanation is that rendering silicic acid hydrophobic takes place technically by partial silylation of the hydroxyl groups present in the particle surface, whereby a specific residual hydroxyl content is required for the conservation of the thixotropic effect. It is therefore also conceivable that during the precipitation process the silicic acid particles are fixed at the boundary surface membrane matrix—water in such a manner that the hydrophobic areas are enclosed by the polymer whereas the hydrophilic areas on the other hand lie freely at the surface.

It cannot be decided at this time which of the two mechanisms are to be preferred with respect to an explanation. It cannot be ruled out, however, that there is an overlapping of both effects. The inventive inclusion of silicic acid is of significance also for cellulose hydrate membranes because it prevents the considerable deterioration of the membrane properties, particularly the reduction of the flow-through rate and the albumin density, during saponification. This in turn is of significance for acetate membranes when the saponification occurs unintentionally during operation, for example as a result of extreme pH values, because the inventive addition of silicic acid will then in this case prevent the deterioration of the properties of the acetate membranes having been partially or completely saponified.

The following examples are intended to elucidate the present invention. All percent data are percent by weight.

EXAMPLE 1

Casting Solution
  11% cellulose triacetate (T 700, Bayer)
  3% hydrophobic pyrogenic silicic acid (Aerosil R 972, Degussa)
  39% acetone
  22% dioxane
  25% formamide The casting solution is doctored onto a casting drum rotating within a precipitating bath of 0° C. The residence time in the air prior to immersion into the precipitating bath is 20 seconds. The precipitated membrane is impregnated with an aqueous 30% glycerin solution and dried within a hot air current of 60° C.

A comparison of the membrane properties prior to and after drying reveals the following results:

|  | not dried | dried |
|---|---|---|
| $D_{H_2O}$ (1/m²h) | 292 | 282 |
| $D_{Ser}$ (1/m²h) | 209 | 185 |
| $R_{Ser}$ (%) | 99.3 | 99.4 |
| $D_{My}$ (1/m²h) | 160 | 158 |
| $R_{My}$ (%) | 95.8 | 96.2 |
| $D_{Cyt}$ (1/m²h) | 250 | 226 |
| $R_{Cyt}$ (%) | 55 | 68 |
| wetting time | — | 12 seconds |
| test conditions: | | |
| filtering pressure: | 1 bar | |
| filtering apparatus: | stirred ultrafiltration cell | |
| concentration of the test solutions: | 0.1% test protein in a 0.9% common salt solution | | meaning of the symbols:

D = flow-through output (l/m²h)
(In protein solutions, the average flow-through output has been indicated with a concentration from the 0.1% solutions to 2%).
R = protein retention (%)
indices:
Ser = serum albumin from oxen, MG = 67.000
My = myoglobin from whales, MG = 17.000
Cyt = cytochrome C from horse hearts, MG = 12.900

EXAMPLE 1a (Comparative Example)

Casting solution
14% cellulose triacetate (T 700, Bayer)
39% acetone
22% dioxane
25% formamide The membrane is prepared as described in Example 1 and dried.

|  | not dried | dried |
|---|---|---|
| $D_{H_2O}$ (l/m²h) | 234 | 138 |
| $D_{Ser}$ (l/m²h) | 200 | 108 |
| $R_{Ser}$ (%) | 99.6 | 99.5 |
| $D_{My}$ (l/m²h) | 130 | 95 |
| $R_{My}$ (%) | 97.9 | 96.8 |
| $D_{Cyt}$ (l/m²h) | 217 | 120 |
| $R_{Cyt}$ (%) | 67 | 70 |
| wetting time | — | after 15 minutes not yet completely wetted |

In contrast to Example 1 where the flow-through rates remain practically the same within the range of the measuring accuracy after drying, a considerable reduction of the flow-through rates (to below 60% of the starting value for pure water) can be seen, in the absence of the filler, after drying, and the wetting time is higher by a multiple value.

EXAMPLE 2

Casting solution
11.2% cellulose triacetate T 700 (Bayer)
2.8% cellulose diacetate E 398-3 (Eastman)
1.0% hydrophobic pyrogenic silicic acid (Aerosil R 972, Degussa)
28.0% acetone
28.0% dioxane
29.0% formamide The membrane is drawn as described in Example 1, impregnated with glycerin and dried.

The membrane properties after drying are as follows:

|  | dried |
|---|---|
| $D_{H_2O}$ (l/m²h) | 330 |
| $D_{Ser}$ (l/m²h) | 167 |
| $R_{Ser}$ (%) | 99.5 |
| $D_{My}$ (l/m²h) | 140 |
| $R_{My}$ (%) | 96.5 |
| $D_{Cyt}$ (l/m²h) | 210 |
| $R_{Cyt}$ (%) | 55 |
| wetting time: | 20 seconds |
| test conditions: filtering pressure: filtering apparatus: concentration of the testing solution: | as in Example 1 |

We claim:

1. In a dry ultrafiltration membrane having an asymmetrical pore structure comprising cellulose triacetate or cellulose triacetate mixed with cellulose diacetate, the improvement wherein said membrane comprises additive means for enhancing wettability, said additive comprising hydrophobic synthetic silicic acid.

2. A membrane in accordance with claim 1, wherein said synthetic silicic acid is pyrogenic hydrophobic silicic acid.

3. A membrane in accordance with claim 1, wherein said synthetic silicic acid is precipitated dried hydrophobic silicic acid.

4. A membrane in accordance with claim 1, wherein said additive constitutes 1 to 30% by weight of the total solid content.

5. A membrane in accordance with claim 4, wherein said additive constitutes 3 to 25% by weight of the total solid content.

6. A membrane in accordance with claim 5, wherein aid additive constitutes 5–10% by weight of the total solid content.

7. A membrane in accordance with claim 1, based on cellulose triacetate which has been replaced up to 30% by weight with cellulose diacetate.

8. A membrane in accordance with claim 1, based on cellulose triacetate which has been replaced up to 25% by weight with cellulose diacetate.

9. A membrane in accordance with claim 1, prepared by casting from a casting solution consisting essentially of 8 to 20% by weight cellulose triacetate or a mixture of cellulose triacetate and cellulose diacetate, 1 to 30% by weight, referred to the total solid content, of hydrophobic silicic acid, acetone and dioxane at a ratio of 2:1 to 1:2 with respect to each other and a lower alkyl amide, wherein the ratio of amide to the solid content is 0.8:1 to 4:1.

10. A membrane in accordance with claim 9 wherein the ratio of acetone to dioxane is 0.8 to 1.2:1.

11. A membrane in accordance with claim 9 wherein said amide is formamide, acetamide or a mixture thereof.

* * * * *

UNITED STATES PATENT AND TRADEMARK OFFICE
CERTIFICATE OF CORRECTION

PATENT NO. : 4,253,963
DATED : March 3, 1981
INVENTOR(S) : FRANKEN ET AL.

It is certified that error appears in the above-identified patent and that said Letters Patent are hereby corrected as shown below:

On the cover page, amend the title to read:

[54] ASYMMETRICAL ULTRAFILTRATION MEMBRANE BASED ON CELLULOSE TRI-ACETATE

Column 1, lines 1-3, ASYMMETRICAL ULTRAFILTRATION MEMBRANE BASED ON CELLULOSE TRIACETATE Column 1, line 7, "assymmetrical" should read --asymmetrical--
Column 1, line 8, delete "of"
Column 1, line 13, delete "of" and insert --based on--
Column 2, line 59, after "object" insert --sought,--
Column 2, line 67, delete "are" and insert --is--
Claim 6, line 2, "aid" should read --said--

Signed and Sealed this

Second Day of March 1982

[SEAL]

Attest:

GERALD J. MOSSINGHOFF

Attesting Officer    Commissioner of Patents and Trademarks